US012585958B2

(12) United States Patent
Kalele et al.

(10) Patent No.: US 12,585,958 B2
(45) Date of Patent: Mar. 24, 2026

(54) METHOD AND SYSTEM FOR TWO-STEP HIERARCHICAL MODEL OPTIMIZATION

(71) Applicant: Tata Consultancy Services Limited, Mumbai (IN)

(72) Inventors: Amit Kalele, Pune (IN); Ravindran Subbiah, Thiruvananthapuram (IN); Anubhav Jain, Noida (IN); Ishank Goel, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 721 days.

(21) Appl. No.: 18/060,628

(22) Filed: Dec. 1, 2022

(65) Prior Publication Data

US 2023/0289613 A1    Sep. 14, 2023

(30) Foreign Application Priority Data

Mar. 8, 2022    (IN) .............................. 202221012640

(51) Int. Cl.
| | | |
|---|---|---|
| *G06N 3/096* | (2023.01) | |
| *G06N 3/042* | (2023.01) | |

(Continued)

(52) U.S. Cl.
CPC ............. *G06N 3/096* (2023.01); *G06N 3/042* (2023.01); *G06N 3/047* (2023.01); *G06N 3/082* (2013.01); *G06N 3/092* (2023.01)

(58) Field of Classification Search
CPC ........ G06N 3/096; G06N 3/042; G06N 3/047; G06N 3/082; G06N 3/092; G06N 3/0495; G06N 3/0985; G06N 5/01; G06N 3/045
See application file for complete search history.

(56) References Cited

U.S. PATENT DOCUMENTS

| | | | | |
|---|---|---|---|---|
| 2020/0311552 A1* | 10/2020 | A | ........................... | G06N 3/092 |
| 2023/0084203 A1* | 3/2023 | Li | ........................ | G06N 3/0464 706/25 |

FOREIGN PATENT DOCUMENTS

| | | |
|---|---|---|
| CN | 110175628 A | 8/2019 |
| CN | 111401567 A | 7/2020 |
| CN | 112906294 A | 6/2021 |

OTHER PUBLICATIONS

Tang, W., Wei, X., & Li, B. (2020). Automated model compression by jointly applied pruning and quantization. arXiv preprint arXiv:2011.06231. (Year: 2020).*

(Continued)

*Primary Examiner* — James T Tsai

(74) *Attorney, Agent, or Firm* — Finnegan, Henderson, Farabow, Garrett & Dunner, LLP

(57) ABSTRACT

State of art approaches independently use a Pruning-weight Clustering-Quantization (PCQ) or Knowledge Distillation (KD) for model optimization and require critical manual intervention. Embodiments of the present disclosure provide a method and system for the two-step hierarchical model optimization approach for generating optimized model DL model. The method comprises a AutoPCQ technique followed by conditional application of an automated KD (AKD) technique. The AutoPCQ technique formulates a problem of configuration selection of the DL model as an optimization problem by iteratively applying Bayesian optimization and Reinforcement Learning. Further, the AKD technique formulates automated search of a student model as the optimization problem with the DL model representing a teacher model. A search space for the student model is defined by a restricted Neural Network Architecture Search that restricts the search space. The method automates the model optimization, in time efficient manner without compromising accuracy of the optimized model.

6 Claims, 8 Drawing Sheets

(51) Int. Cl.
  *G06N 3/047* (2023.01)
  *G06N 3/082* (2023.01)
  *G06N 3/092* (2023.01)

(56) References Cited

OTHER PUBLICATIONS

Xie, H., Jiang, W., Luo, H., & Yu, H. (2021). Model compression via pruning and knowledge distillation for person re-identification. Journal of Ambient Intelligence and Humanized Computing, 12(2), 2149-2161. (Year: 2021).*

Gaurav Menghani, "Efficient Deep Learning: A Survey on Making Deep Learning Models Smaller, Faster, and Better," Machine Learning, Jun. 2021, Arxiv, https://arxiv.org/pdf/2106.08962.pdf.

Roy Henha Eyono et al., "AUTOKD: Automatic Knowledge Distillation Into A Student Architecture Family," Machine Learning, 2021, Arxiv, https://arxiv.org/pdf/2111.03555.pdf.

* cited by examiner

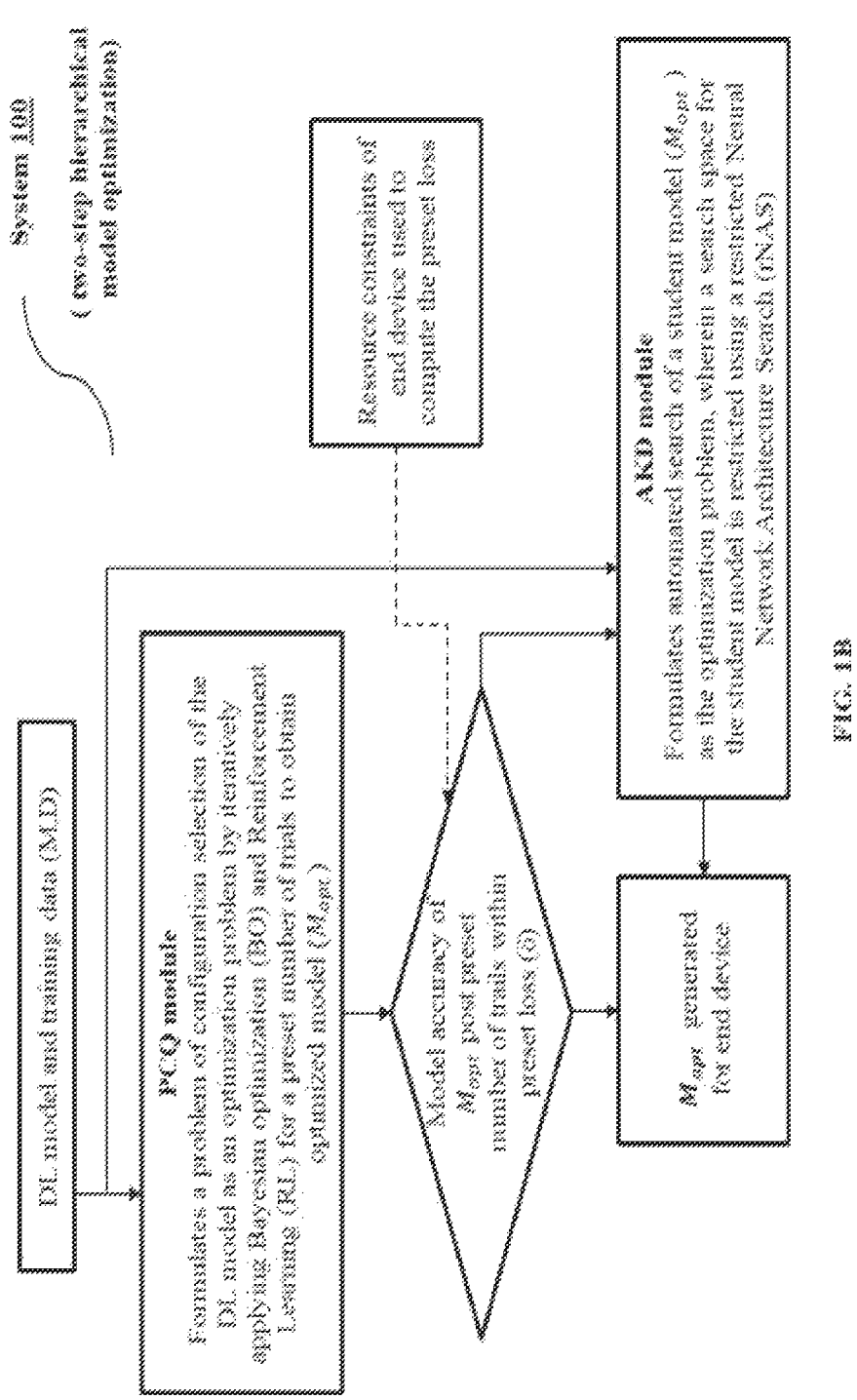

System 100
(two-step hierarchical model optimization)

DL model and training data (MD)

PCO module

Formulates a problem of configuration selection of the DL model as an optimization problem by iteratively applying Bayesian optimization (BO) and Reinforcement Learning (RL) for a preset number of trials to obtain optimized model ($M_{opt}$)

Resource constraints of end device used to compute the preset loss

AKD module

Formulates automated search of a student model ($M_{opt^*}$) as the optimization problem, wherein a search space for the student model is restricted using a restricted Neural Network Architecture Search (rNAS)

Model accuracy of $M_{opt}$ past preset number of trials within preset loss (⊕)

$M_{opt^*}$ generated for end device

FIG. 1B

200 receiving an input comprising a) a DL model, b) a training dataset for the DL model comprising training data, validation data and test data and, c) resource constraints of an end device on which the DL model is to be implemented ⌐ 202 applying a two-step hierarchical model optimization approach on the DL model to obtain an optimized model ($M_{opt}$) fitting to the resource constraints, comprising a PCQ technique followed by conditional application of an AKD technique ⌐ 204 triggering the PCQ technique that formulates a problem of configuration selection of the DL model as an optimization problem by iteratively applying Bayesian optimization (BO) and Reinforcement Learning (RL), the PCT technique comprising: ⌐ 204a (i)     defining a Configuration Space ($CS$) for the DL model on which optimization is to be carried out, wherein the $CS$ comprising parameter configurations for a pruning ($C_p$) , a weight clustering ($C_{wc}$) , a quantization ($C_q$),model layer configuration ($C_m$) for the DL model, wherein $\{CS = C_p \cup C_{wc} \cup C_q \cup C_m\}$;

(ii)     obtaining the optimized model ($M_{opt}$) of the DL model in accordance with the Configuration Space $\{CS = C_p \cup C_{wc} \cup C_q \cup C_m\}$ using the training dataset by iteratively performing, for a preset number of trials

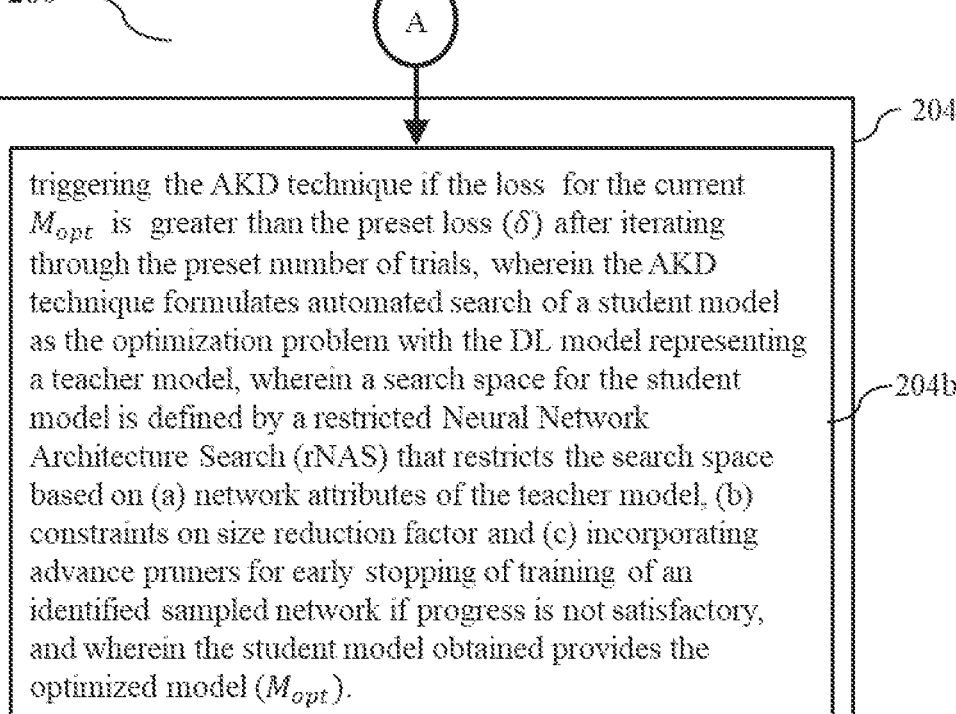

204 triggering the AKD technique if the loss for the current $M_{opt}$ is greater than the preset loss ($\delta$) after iterating through the preset number of trials, wherein the AKD technique formulates automated search of a student model as the optimization problem with the DL model representing a teacher model, wherein a search space for the student model is defined by a restricted Neural Network Architecture Search (rNAS) that restricts the search space based on (a) network attributes of the teacher model, (b) constraints on size reduction factor and (c) incorporating advance pruners for early stopping of training of an identified sampled network if progress is not satisfactory, and wherein the student model obtained provides the optimized model ($M_{opt}$).

METHOD AND SYSTEM FOR TWO-STEP HIERARCHICAL MODEL OPTIMIZATION

PRIORITY CLAIM

This U.S. patent application claims priority under 35 U.S.C. § 119 to: Indian Patent Application No. 202221012640, filed on Mar. 8, 2022. The entire contents of the aforementioned application are incorporated herein by reference.

TECHNICAL FIELD

The embodiments herein generally relate to optimizing deep learning models and, more particularly, to a method and system for two-step hierarchical model optimization.

BACKGROUND

With advancement in Artificial Intelligence (AI), many applications and solution are being developed which has bearing in Deep Learning (DL). Deep Learning models are becoming accurate but at the same time their resource requirements, in terms of memory and computational cost, are growing. However, in practice, many business applications require these models to be deployed in a constrained resource environment, such as edge devices. Conventional methods for model optimization involve pruning, weight clustering quantization and transforming various layers in a model. Similarly, techniques like knowledge distillation achieves optimization by training a newer smaller (student) model which has small memory footprint compared to the original model. These methods and techniques require careful tuning by an expert or a data scientist to be effective. Each approach has its own limitations. For example, (1) Hardware (HW) specific methods: OEMs like Intel and Nvidia offer model optimization specific to their HW. (2) Model Format: Model optimization framework such as Intel OpenVino™ works by converting model to a proprietary format. If conversion fails, it is not possible to optimize model via Open Vino. (3) Lack of Automation: Tensor Flow framework offers functionality for model optimization via pruning, clustering, and quantization. However, to effectively use these data-scientist and experts need to carry out large number of trial and error experiments. (4) Student Model Search: In general, Knowledge Distillation (KD) techniques provide an approach for training student model with a new loss function. However, they do not provide a mechanism for choice of student model. This is typically done via Neural Architecture Search (NAS) which is extremely expensive in terms of time and compute resources. (5) In general model optimization methods achieve reduction in memory footprint or latency at the cost of loss in accuracy. Reducing the memory footprint and latency of the DL models is required for production deployment. This is achieved by either OEM frameworks, model pruning weight clustering quantization or with the help of knowledge distillation techniques. Each of these approaches have some or the other limitations as discussed above.

Thus, currently manual intervention is critical in the field of model optimization. The manual model optimization process primarily encompasses critical tasks which a data scientist performs. Pruning, weight clustering and quantization has large number of inter-depended parameters which need to be configured for better results. Manually setting appropriate value requires large number of trial and error experiments. Along with above mentioned parameter configuration, data scientist also needs to decide on which layers of the model to apply these techniques, how much quantity, and at what frequency etc. Data scientists carefully select configurations to try and after observing the outcome they adjust parameter values and keep experimenting iteratively till satisfactory results are obtained. Automating the manual intelligence to obtain optimized model is a technically challenging.

In another widely used approach, selecting student network requires replicating entire modeling exercise where normal training is replaced by KD based training. This involves: (a) Network architecture design and its hyper parameter selection. This process of creating a new architecture is complex, completely manual and time consuming. There are number of KD method proposed in literature, with each method having its own advantages. However, choosing a suitable KD technique is entirely relied on data scientist's intervention. Thus, KD based approaches in the art focus on training the student model and hardly any attempts have been made towards student selection.

SUMMARY

Embodiments of the present disclosure present technological improvements as solutions to one or more of the above-mentioned technical problems recognized by the inventors in conventional systems.

For example, in one embodiment, a method for model optimization is provided. The method includes receiving an input, wherein the input comprising a) a Deep learning (DL) model, b) a training dataset comprising for the DL model, comprising a training data, a validation data and a test data, and c) resource constraints of an end device on which the DL model is to be implemented. Further, the method includes applying a two-step hierarchical model optimization approach on the DL model to obtain an optimized model $(M_{opt})$ fitting to the resource constraints, by utilizing an Automated Pruning-weight Clustering-Quantization (AutoPCQ) technique followed by conditional application of an Automated Knowledge Distillation (AKD) technique. The two-step hierarchical model optimization approach comprising triggering the AutoPCQ technique that formulates a problem of configuration selection of the DL model as an optimization problem by iteratively applying a Bayesian Optimization (BO) and a Reinforcement Learning (RL), the AutoPCQ technique comprising: (i) defining a Configuration Space (CS) for the DL model on which optimization is to be carried out, wherein the CS comprising parameter configurations for a pruning $(C_p)$, a weight clustering $(C_{wc})$, a quantization $(C_q)$, and a model layer configuration $(C_m)$ for the DL model, wherein $\{CS=C_p \cup C_{wc} \cup C_q \cup C_m\}$; and (ii) obtaining the optimized model $(M_{opt})$ of the DL model in accordance with the Configuration Space $\{CS=C_p \cup C_{wc} \cup C_q \cup C_m\}$ using the training dataset by iteratively performing, for a preset number of trials, steps comprising: (1) retrieving one or more best configurations (c) from a KSTORE for the DL model in accordance with the Configuration Space (CS) based on attribute matching with respect to a plurality of attributes derived for the DL model; (2) performing an initial optimizing of the DL model to obtain a current $M_{opt}$ based on the retrieved one or more configurations using the AutoPCQ technique; (3) evaluating the current $M_{opt}$ using the trained dataset to determine a loss and a compression factor with respect to the DL model; and (4) comparing the loss in each iteration against a preset loss ($\delta$) to identify the current $M_{opt}$ as the optimized model $(M_{opt})$ if the loss is less than a preset loss ($\delta$), computed based on

3 the resource constraints of the end device. Further, the method includes triggering the AKD technique if the loss for the current $M_{opt}$ is greater than the preset loss ($\delta$) after iterating through the preset number of trials, wherein the AKD technique formulates automated search of a student model as the optimization problem with the DL model representing a teacher model, wherein a search space for the student model is defined by a restricted Neural Network Architecture Search (rNAS) that restricts the search space based on (a) network attributes of the teacher model, (b) constraints on size reduction factor and (c) incorporating advance pruners for early stopping of training of an identified sampled network if progress is not satisfactory, and wherein the student model obtained provides the optimized model ($M_{opt}$).

In another aspect, a system for model optimization is provided. The system comprises a memory storing instructions; one or more Input/Output (I/O) interfaces; and one or more hardware processors coupled to the memory via the one or more I/O interfaces, wherein the one or more hardware processors are configured by the instructions to receive an input, wherein the input comprising a) a Deep learning (DL) model, b) a training dataset comprising for the DL model, comprising a training data, a validation data and a test data, and c) resource constraints of an end device on which the DL model is to be implemented. Further, the one or more hardware processors are configured to apply a two-step hierarchical model optimization approach on the DL model to obtain an optimized model ($M_{opt}$) fitting to the resource constraints, by utilizing an Automated Pruning-weight Clustering-Quantization (AutoPCQ) technique followed by conditional application of an Automated Knowledge Distillation (AKD) technique. The two-step hierarchical model optimization approach comprising triggering the AutoPCQ technique that formulates a problem of configuration selection of the DL model as an optimization problem by iteratively applying a Bayesian Optimization (BO) and a Reinforcement Learning (RL), the AutoPCQ technique comprising: (i) defining a Configuration Space (CS) for the DL model on which optimization is to be carried out, wherein the CS comprising parameter configurations for a pruning ($C_p$), a weight clustering ($C_{wc}$), a quantization ($C_q$), and a model layer configuration ($C_m$) for the DL model, wherein {CS=$C_p \cup C_{wc} \cup C_q \cup C_m$}; and (ii) obtaining the optimized model ($M_{opt}$) of the DL model in accordance with the Configuration Space {CS=$C_p \cup C_{wc} \cup C_q \cup C_m$} using the training dataset by iteratively performing, for a preset number of trials, steps comprising: (1) retrieving one or more best configurations (c) from a KSTORE for the DL model in accordance with the Configuration Space (CS) based on attribute matching with respect to a plurality of attributes derived for the DL model; (2) performing an initial optimizing of the DL model to obtain a current $M_{opt}$ based on the retrieved one or more configurations using the AutoPCQ technique; (3) evaluating the current $M_{opt}$ using the trained dataset to determine a loss and a compression factor with respect to the DL model; and (4) comparing the loss in each iteration against a preset loss ($\delta$) to identify the current $M_{opt}$ as the optimized model ($M_{opt}$) if the loss is less than a preset loss ($\delta$), computed based on the resource constraints of the end device. Further, the one or more hardware processors are configured to trigger the AKD technique if the loss for the current $M_{opt}$ is greater than the preset loss ($\delta$) after iterating through the preset number of trials, wherein the AKD technique formulates automated search of a student model as the optimization problem with the DL model representing a teacher model, wherein a search space for the student model is defined by a restricted Neural Network Architecture Search (rNAS) that restricts the search space based on (a) network attributes of the teacher model, (b) constraints on size reduction factor and (c) incorporating advance pruners for early stopping of training of an identified sampled network if progress is not satisfactory, and wherein the student model obtained provides the optimized model ($M_{opt}$).

In yet another aspect, there are provided one or more non-transitory machine-readable information storage mediums comprising one or more instructions, which when executed by one or more hardware processors causes a method for model optimization. The method includes receiving an input, wherein the input comprising a) a Deep learning (DL) model, b) a training dataset comprising for the DL model, comprising a training data, a validation data and a test data, and c) resource constraints of an end device on which the DL model is to be implemented. Further, the method includes applying a two-step hierarchical model optimization approach on the DL model to obtain an optimized model ($M_{opt}$) fitting to the resource constraints, by utilizing an Automated Pruning-weight Clustering-Quantization (AutoPCQ) technique followed by conditional application of an Automated Knowledge Distillation (AKD) technique. The two-step hierarchical model optimization approach comprising triggering the AutoPCQ technique that formulates a problem of configuration selection of the DL model as an optimization problem by iteratively applying a Bayesian Optimization (BO) and a Reinforcement Learning (RL), the AutoPCQ technique comprising: (i) defining a Configuration Space (CS) for the DL model on which optimization is to be carried out, wherein the CS comprising parameter configurations for a pruning ($C_p$), a weight clustering ($C_{wc}$), a quantization ($C_q$), and a model layer configuration ($C_m$) for the DL model, wherein {CS=$C_p \cup C_{wc} \cup C_q \cup C_m$}; and (ii) obtaining the optimized model ($M_{opt}$) of the DL model in accordance with the Configuration Space {CS=$C_p \cup C_{wc} \cup C_q \cup C_m$} using the training dataset by iteratively performing, for a preset number of trials, steps comprising: (1) retrieving one or more best configurations (c) from a KSTORE for the DL model in accordance with the Configuration Space (CS) based on attribute matching with respect to a plurality of attributes derived for the DL model; (2) performing an initial optimizing of the DL model to obtain a current $M_{opt}$ based on the retrieved one or more configurations using the AutoPCQ technique; (3) evaluating the current $M_{opt}$ using the trained dataset to determine a loss and a compression factor with respect to the DL model; and (4) comparing the loss in each iteration against a preset loss ($\delta$) to identify the current $M_{opt}$ as the optimized model ($M_{opt}$) if the loss is less than a preset loss ($\delta$), computed based on the resource constraints of the end device. Further, the method includes triggering the AKD technique if the loss for the current $M_{opt}$ is greater than the preset loss ($\delta$) after iterating through the preset number of trials, wherein the AKD technique formulates automated search of a student model as the optimization problem with the DL model representing a teacher model, wherein a search space for the student model is defined by a restricted Neural Network Architecture Search (rNAS) that restricts the search space based on (a) network attributes of the teacher model, (b) constraints on size reduction factor and (c) incorporating advance pruners for early stopping of training of an identified sampled network if progress is not satisfactory, and wherein the student model obtained provides the optimized model ($M_{opt}$). It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 1B illustrates an architectural overview representing over all process flow of the system of FIG. 1, in accordance with some embodiments of the present disclosure.

FIGS. 2A and 2B (collectively referred as FIG. 2) is a flow diagram illustrating a method for the two-step hierarchical model optimization approach, using the system of FIG. 1, in accordance with some embodiments of the present disclosure.

Figure 1A:
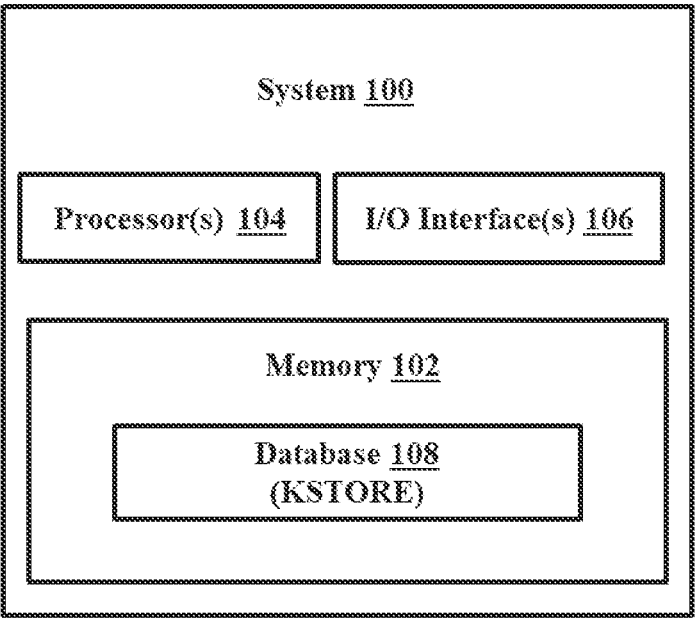
FIG. 1A is a functional block diagram of a system, for a two-step hierarchical model optimization approach, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As mentioned above, hardly any attempts have been made to completely automate model optimization process. Complete elimination of manual intelligence for defining parameters during Pruning-weight Clustering-Quantization (PCQ) approaches or selection of as student model in Knowledge Distillation (KD) techniques for model optimization is an unaddressed technical challenge. Further, each of the above techniques has been used independently and no attempts have been made towards (a). applying these to all kinds of deep learning model in an intelligent and automated fashion without involvement of an expert data scientist, (b) no efforts made towards reducing number of trials and error experiments, whereas method and system disclosed herein arrives at optimal solution in number of steps which are less by factor of magnitude used in traditional approaches. However, combining the PCQ and KD approaches as disclosed by the method herein, a provides a better generic solution for broader scenarios of model optimization, as resource constraints of each end device vary from application to application.

Embodiments of the present disclosure provide a method and system for the two-step hierarchical model optimization approach for generating optimized model for Deep Learning (DL) model. The method comprises an Automated Pruning-weight Clustering-Quantization (AutoPCQ) technique followed by conditional application of an Automated Knowledge Distillation (AKD) technique. The method applies the AutoPCQ approach as default, and if the output optimized model does not satisfy target device constraints, then the method automatically switches to AKD.

The AutoPCQ technique formulates a problem of configuration selection of the DL model as an optimization problem by iteratively applying Bayesian optimization (BO) and Reinforcement Learning (RL). Further, the AKD technique formulates automated search of a student model as the optimization problem with the DL model representing a teacher model. A search space for the student model is defined by a restricted Neural Network Architecture Search (rNAS) that restricts the search space. The method automates the model optimization, in time efficient manner without compromising accuracy of the optimized model.

The method can handle all kinds of deep learning models encompassing different kinds of layers (CNN, LSTM, RNNs, Dense etc.) rather than only handling CNN layers. The method iteratively learns what combinations, how much quantity and further parameters of the PCQ techniques via reward-based feedback mechanism.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1A is a functional block diagram of a system, for a two-step hierarchical model optimization approach, in accordance with some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with the one or more hardware processors 104 is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to receive end user requirements, and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a database 108 that stores the various BO techniques, RL models and the like. Further, the memory 102 includes a plurality of modules such as a PCQ module, a AKD module (as depicted in FIG. 1B). The database 108, may also store a KSTORE which stores experimental knowledge, best practices from subject matter expertise and best known configurations from history on similar models. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction with flow diagram of FIG. 1B and flow diagram of FIG. 2.

FIG. 1B illustrates an architectural overview representing over all process flow of the system of FIG. 1, in accordance with some embodiments of the present disclosure.

FIGS. 2A and 2B (collectively referred as FIG. 2) is a flow diagram illustrating a method 200 for the two-step hierarchical model optimization approach, using the system of FIG. 1, in accordance with some embodiments of the present disclosure.

Figure 3:
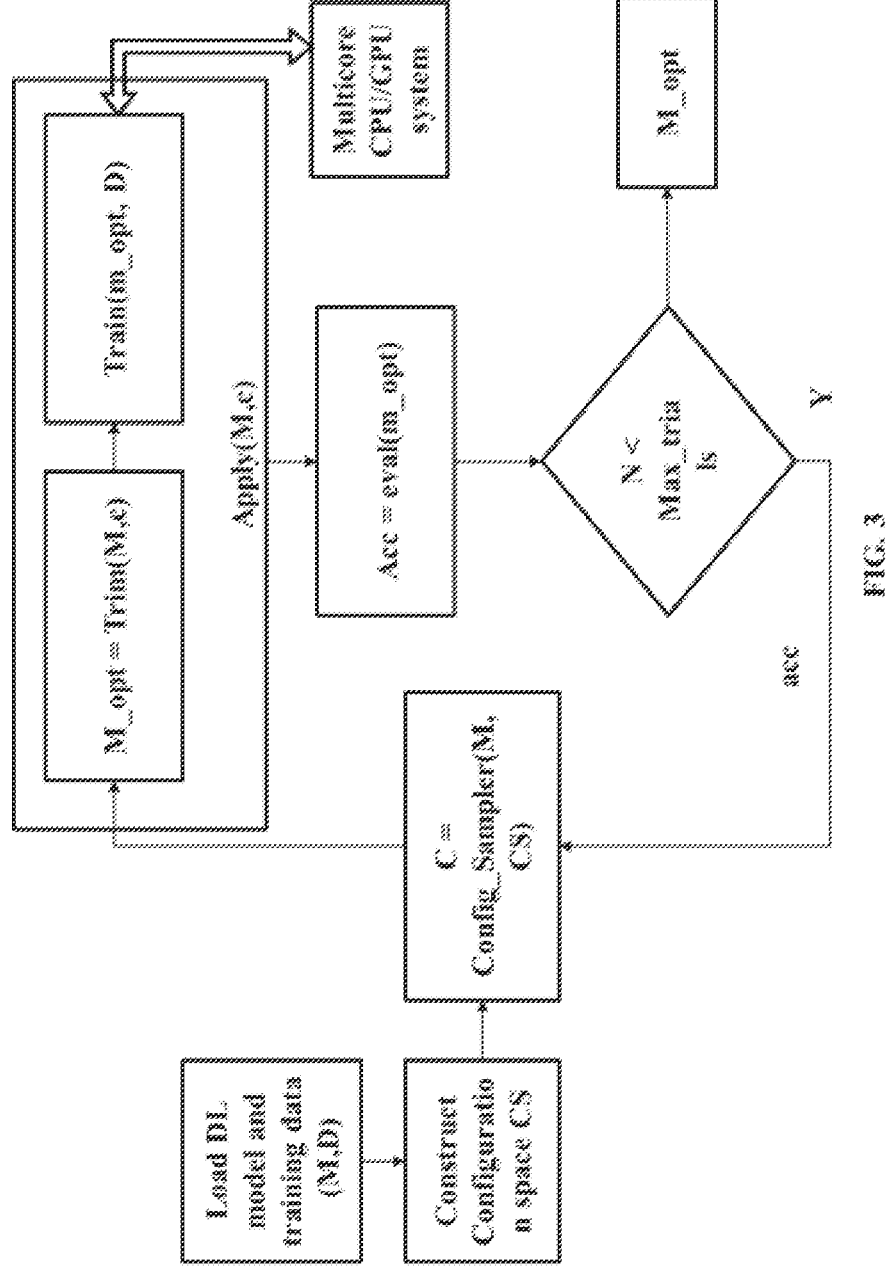
FIG. 3 depicts a functional flow of an Automated Pruning-weight Clustering-Quantization (AutoPCQ) technique in the two-step hierarchical model optimization, in accordance with some embodiments of the present disclosure.
Figure 4:
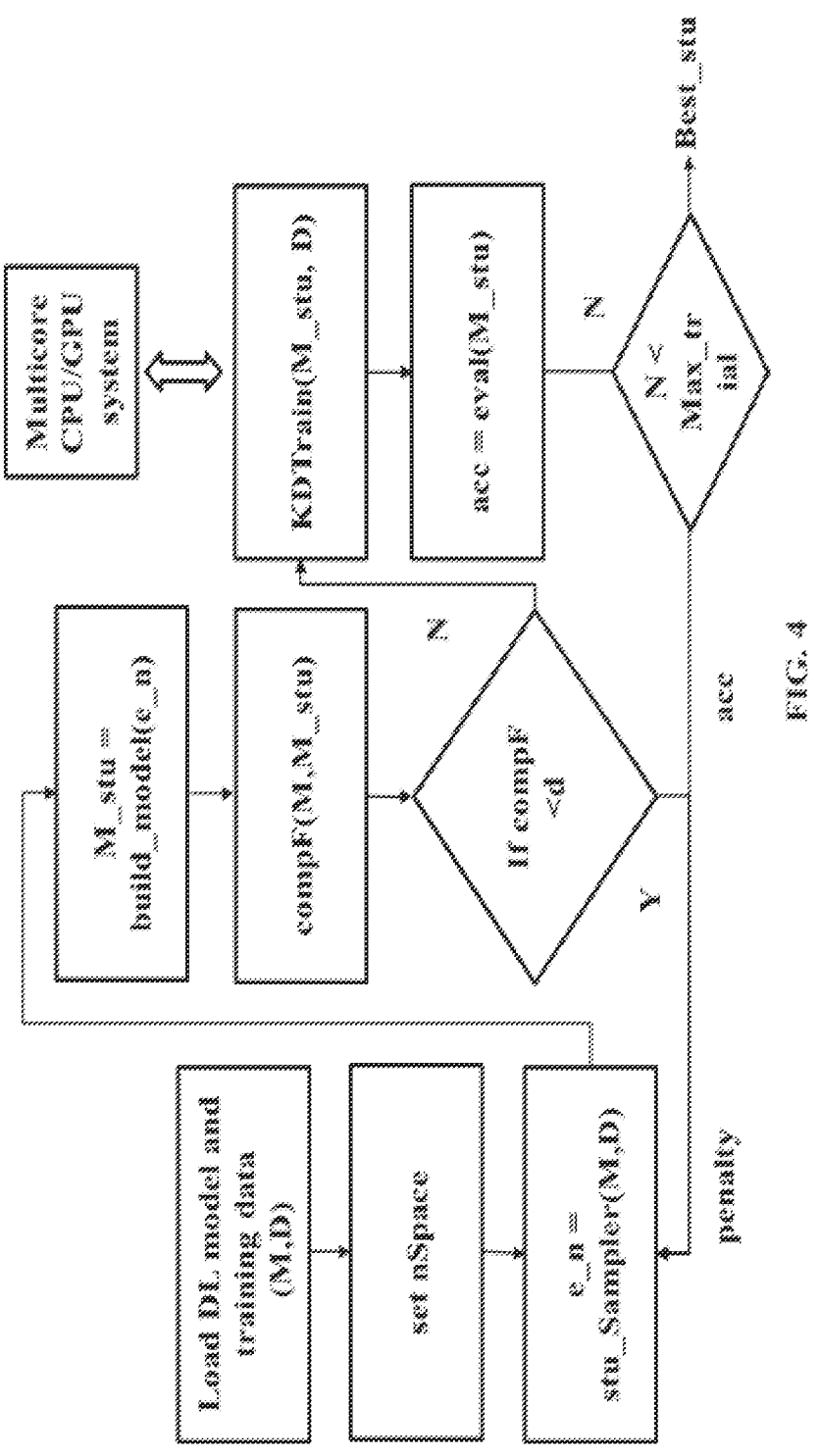
FIG. 4 depicts a functional flow of an Automated Knowledge Distillation (AKD) technique in the two-step hierarchical model optimization conditionally applied post the AutoPCQ technique, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in system 100 of FIGS. 1A and 1B and the steps of flow diagram as depicted in FIG. 2, FIG. 3, and FIG. 4. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202 of the method 200, the one or more hardware processors 104 receive an input, comprising a) a Deep learning (DL) model to be optimized, b) a training dataset for the DL model comprising training data, validation data and test data, which is used for training, testing, and validating an optimized model and, c) resource constraints of an end device on which the DL model is to be implemented. The resource constraints generally refer to Hardware (HW) constraints of the end device such as small memory footprint. The method considers CPUs/GPUs/FPGAs other mobile processors for optimization.

For the received DL model and the HW constraints, the method enables to identify an appropriate approach to ensure best optimization is obtained for the DL model, while retaining accuracy to maximum or reducing loss due to optimization to minimum. It can be noted, as mentioned earlier that not all end use case scenarios can rely on one method of optimization. Thus, method disclosed herein enables a check on ensuring the most appropriate technique is used for the received DL model for HW constraints specified by the end user. Thus, at step 204 of the method 200, the one or more hardware processors 104 apply the two-step hierarchical model optimization approach on the DL model to obtain an optimized model ($M_{opt}$) fitting to the resource constraints. The method 200 utilizes the AutoPCQ technique followed by conditional application of the AKD technique based on the two-step hierarchical model optimization approach.

Once the input is received, firstly, at step 204a, the one or more hardware processors 104 trigger the AutoPCQ technique that formulates the problem of configuration selection of the DL model as the optimization problem by iteratively applying the BO and the RL. Thus, unlike works in literature where configuration selection is a trial error process involving manual intervention, the method 200 disclosed herein automates the process to arrive at an optimal configuration using the AutoPCQ technique disclosed herein.

The AutoPCQ technique comprises:
(i) Defining a Configuration Space (CS) for the DL model which comprises parameter configurations for a pruning ($C_p$), a weight clustering ($C_{wc}$), a quantization ($C_q$), and a model layer configuration ($C_m$) for the DL model, wherein $\{CS=C_p \cup C_{wc} \cup C_q \cup C_m\}$. The $C_m$ consists of all possible parameter configurations arising due to model M, like type of layers (dense, conv2D, LSTM etc.), number of layers (selective or all), which section of model layers (starting, middle or end) on which model optimization to be applied. The total number of configurations in CS is extremely large which make a randomized trial and error approach for configuration selection almost impossible. As method employs different techniques for optimization like Bayesian optimization, Reinforcement learning based optimization, wherein each has a unique way to define the configuration space, an abstraction was defined to provide a unified way to define configuration space which automatically generates the configuration space with specific format as per the optimization method.
(ii) Once the (CS) is defined, then the optimized model ($M_{opt}$) of the DL model is obtained in accordance with the Configuration Space $\{CS=C_p \cup C_{wc} \cup C_q \cup C_m\}$ using the training dataset. Unlike the works in literature, the method automatically determines the parameter values of $C_p$, $C_{wc}$, $C_q$, $C_m$ to obtain $M_{opt}$. The $M_{opt}$ is obtained by iteratively performing steps (1-4 below), for a preset number of trials (N), wherein N can be set to 100, 200 etc. The value of N can be defined by subject matter expert based on choice of optimization method (BO or RL), for BO minimum value of N should be greater than 20 as initial 15-20 trials are random for prior distribution generation. Further, depending on the time for single trial, N is chosen to achieve a good balance between time for processing and fair chance of achieving optimal model. For each C*, the parameters are either floats, integer, string or categorical. The step for AutoPCQ based $M_{opt}$ include:
1) Retrieving one or more best configurations (c) from a KSTORE for the DL model in accordance with the Configuration Space (CS) based on attribute matching with respect to a plurality of attributes derived for the DL model.
2) Performing an initial optimizing of the DL model to obtain a current $M_{opt}$ based on the retrieved one or more configurations using the AutoPCQ technique.
3) Evaluating the current $M_{opt}$ using the trained dataset to determine a loss and a compression factor with respect to the DL model.
4) Comparing the loss in each iteration against a preset loss ($\delta$) to identify the current $M_{opt}$ as the optimized model ($M_{opt}$) if the loss is less than a preset loss ($\delta$). The preset loss ($\delta$) is computed based on the resource constraints of the end device and can be automatically computed by the system 100 or defined by a subject matter expert. A suitable loss function ($loss_m$) which accommodates accuracy and model compression is highly desired without being biased towards either is important. The loss function is defined as $$loss_m = \max \alpha \times acc + \beta \times compF$$

where $$compF = \frac{\eta t}{\eta s},$$

and $$\beta = c \times (1 - \alpha).$$

FIG. 3 depicts a functional flow of the Pruning-weight Clustering-Quantization (PCQ) technique explained in algorithm 1, 2, 3 and 4 below, in accordance with some embodiments of the present disclosure. The describes the automated PCQ technique for DL model optimization process.

---

Algorithm 1: AutoPCQ optimizes model via pruning, clustering and quantization

```
Data: Model M, Data D_M = {D_train, D_val, D_test}
Data: Configuration space CS = {C_p ∪ C_wc ∪ C_q ∪ C_m}
    where C* are respective configurations
Result: Optimized model M_opt
Initialize: n = 0, δ, MAX_TRIALS;
while n ≤ MAX_TRIALS do
    c = confiGen.predict(CS);
    M_opt = applyMethod(M,c);
    {loss_m, compF } = evalModel(M, M_opt, D_val);
    if loss_m ≤ δ then
        return M_opt;
    end
    confiGen.train(loss_m);
    n + +;
end
return M_opt
```

---

Algorithm 2: confiGen samples new parameter configuration c

```
Data: Model M, Data D_m
Data: Configuration space CS = {C_p ∪ C_wc ∪ C_q ∪ C_m}
    where C* are respective configurations
Data: loss, compF
Result: Sampled configuration c ∈ CS
Initialize: Δ, KSTORE;
if confiGen.predict == TRUE then
    { a } = computeAttrib(M, D_m);
    if similarity(a, KSTORE.PCQ.attributes) then
        c = KSTORE.PCQ.retrive.config;
        KSTORE.PCQ.update.config=USED
    end
    else
        c = samplerM.predict(CS, loss);
    end
    return c
end
else if confiGen. train == TRUE then
    if samplerM == BO then
        BOsampler.train(CS, c, loss);
    end
    else if samplerM == RL then
        if compF ≤ Δ then
            reward = −1;
        end
        else
            reward = calc_reward(loss);
        end
        agentRL.train(CS, c, reward)
    end
end
```

Algorithm 3: applyMethod Optimizes model based on input configuration c

```
Data: Model M, D_train
Data: Configuration c ∈ CS where c = {c_p ∪ c_wc ∪ c_q ∪ c_m}
Result: M_opt
if c.method == PRUNE then
    M_opt = prune_method(M, c_p);
else if c.method == CLUSTER then
    M_opt = cluster_method(M, c_wc);
end
else if c.method == PRUNE_n_CLUSTER then
    M_opt = prune_method(M, c_p);
    M_opt = cluster_method(M_opt, c_wc);
end
else if c.method == CLUSTER_n_PRUNE then
    M_opt = cluster_method(M, c_wc);
    M_opt = prune_method(M_opt, c_p);
end
else if c.method == PRUNE_n_QUANTIZE then
    M_opt = prune_method(M, c_p);
    M_opt = quantize_method(M_opt, c_q);
end
else if c.method == CLUSTER_n_QUANTIZE then
    M_opt = cluster_method(M, c_wc);
    M_opt = quantize_method(M_opt, c_q);
end
return M_opt
```

---

Algorithm 4: evalModel evaluates model and returns loss and compression factor

```
Data: Model M, Data D_M = {D_val: X_val , y_val}
Result: model loss
Initialize α, β ∈ [0... 1];
count = θ;
y_pred = M_opt.predict(X_val);
for i in range(y_pred.len) do
    if (y_pred [i] == y_val[i]) then
        count++;
    end
end
s1 = getZippedSize(M);
s2 = getZippedSize(M_opt);
compF = s1/s2;
acc = count/y_val.len;
if loss.choice == acc then
    α = 1, β = 0;
end
loss = α · acc + β · compF;
return loss, compF
```

The confiGen( ) module as explained in algorithm 2, is the core which drives the entire automated optimization. BO optimization uses initial 15-20 trails for building internal sampling model and uses these observations as prior distribution of the cost function. The subsequent trials (selecting a configuration and applying it to model and observing output) are made through this model and model is refined based on output observation in each trial. Similarly, RL starts with random sample predictions and learns from the reward based on the output by retraining the LSTM based sampler model on (c, reward) pair. The confiGen( ) module predicts a new configuration c and applyMethod( ), as explained in algorithm 3, carries out model trimming based on c and produces the optimized model ($M_{opt}$). It is known that RL is sensitive to hyperparameter and usually slow to learn new task. In the example implementation, a shallow LSTM network is combined with dense and time distributed layer. Similarly, a unique reward mechanism is incorporated which rewards and penalizes agent in nonlinear fashion. Both helps in faster learning.

Then evalModel( ) as explained in algorithm 4 computes the model performance on validation data and reports obtained loss ($loss_m$) and compression factor. A variety of loss can be configured in the method. The process is either terminated or continued based on the ($M_{opt}$) performance (usually accuracy on validation data). The confiGen sampler is then trained on the $\{c, loss_m\}$ pair. This process is repeated till maximum trial is reached. The confiGen( ) contains KSTORE, a knowledge or experience store, which stores historical records $\{a, C\}$ where a and C are derived attributes from model M and it's top performing configurations respectively. The algorithm 1 first computes the attributes from input DL model (M) and retrieves the best configuration/s from the KSTORE based on attribute matching and optimizes model on the retrieved configurations. This helps in reducing the model optimization time in many cases. The applyMethod( ) module takes two inputs namely the model M (input DL model) to be optimized and the configuration $\{c=C_p, C_{wc}, C_q, C_m\}$ generated by confiGen. It applies pruning, clustering, quantization, or their combination to model M. The developed method configures the prune, cluster, and quantization function of underlying framework (e.g., tensorflow) with the respective set of parameters ($c_p$, $c_{wc}$, $c_q$) and applies to model ($M_{opt}$) as per model parameters $c_m$.

Once the AutoPCQ technique is executed, however, the loss for the current $M_{opt}$ is greater than the preset loss ($\delta$) after iterating through the preset number of trials then at step 204b, the AKD technique is triggered. As mentioned the AKD technique formulates automated search of a student model as the optimization problem with the DL model representing a teacher model. A generic NAS is expensive computationally and takes long time. Thus, the search space for the student model is defined by a restricted Neural Network Architecture Search (rNAS) that restricts the search space and saves search time. The search space is restricted based on (a) network attributes of the teacher model, (b) constraints on size reduction factor and (c) incorporating advance pruners for early stopping of training of an identified sampled network if progress is not satisfactory, and wherein the student model obtained provides the optimized model ($M_{opt}$). The AKD technique comprises steps of:

(i) Inspecting the DL model, which is the teacher model, to generate a model summary. Typically, model summary provides model layer types, input output shapes of all layers, number of weights and biases, connection between layers etc.
  (ii) Setting, based on the model summary, an upper limit, and a lower limit of each network parameter in network search space of the rNAS to restrict the network search space. Each BO methods has its unique way to define search space. The method disclosed implements a unique mechanism which enables abstraction for single search space.
  (iii) Iteratively perform, until the preset number of trials is reached, steps of:
    Predicting an encoded sample network (refer algorithm 5).
    Constructing and compiling the student model based on the encoded sample network using the BO and RL via a student generator (refer algorithm 6). The BO/RL based sampler, generates student network encoding which represents number of layers, type of layers, number of neuron, kernel size, activation etc. as applicable and connections between layers. Using this encoded network description, the actual deep learning network is constructed using functions of underlying framework (TF/Keras etc.).

Estimating size reduction of the student model by calculating a ratio ($\eta$) of number of parameters or ratio of zipped size of the teacher model and the student model.
    Performing one of (a) training the student model if the $\eta$ is above a preset threshold, and (b) skipping the training and penalizing the student generator (refer algorithm 7).

FIG. 4 depicts in conjunction with algorithm 5 depicts a functional flow of an Automated Knowledge Distillation (AKD) technique explained in further conjunction with algorithm 6 and 7, in accordance with some embodiments of the present disclosure. The algorithm 5 samples various neural architectures and trains them using KD techniques. The probe( ) function inspects the input model M (DL model( ) and collect model summary. Based on the model summary, confSpace( ) module sets the upper and lower limits of each network parameter in search space which results in restricted search space. A new encoded sample network e_n is predicted each time by Sampler( ) module of stuGen. The module buildStu( ) constructs and compiles the student model M_stu. Before training the student model, the size reduction with respect to the teacher model is estimated either by calculating ratio of number of parameters or ratio of zipped size of both the models. If this ratio is below certain threshold ($\eta$), as mentioned the training of the sampled student model is skipped and only the sampler is trained with penalty. This again helps in cutting down training time of undesirable networks. The model is then trained with the help of KD technique by kdTrain( ) module. This training is monitored by stuGen, which prunes the training if progress is not satisfactory. This helps in reducing overall search time.

---

Algorithm 5: AutoKD generates and trains smaller model

---

Data: Model M, Data $D_m$ = {D_train, D_val, D_test}
Result: Student model $M_{stu}$
Initialize: n = 0, $\delta$ , $loss_b$ = ∞;
{s} = probe(M);
nSpace = confSpace(s);
while n ≤ MAX_TRIALS do
  en = stuGen.Sampler.predict(nSpace);
  M_stu = buildStu(e_n);
  $n_t$ =nParam(M), $n_s$ =nParam(M_stu);
  if $n_t / n_s$ ≤ $\eta$ then
    $loss_m$ = 1 /* penalty for sampling large networks*/;
    stuGen.Sampler.train(loss_m, e_n)
  end
  else
    $loss_m$ = stuGen.kdTrain(M, M_stu, D_m);
    if $loss_m$ ≤ $\delta$ then
      KSTORE.nasKD.save(e_n)
    end
    if $loss_m$ ≤ $loss_b$ then
      $M_b$ ← $M_{stu}$;
      $loss_b$ ←$loss_m$
    end
    stuGen.Sampler.train(loss_m, e_n);
  end
  n + +;
end
return Mb

---

Algorithm 6: stuGen samples new student networks and trains them with KD and also trains its sampler

---

Data: Model $M_{stu}$, Data $D_m$
Data: Search space nSpace

-continued

---

Algorithm 6: stuGen samples new student networks and
trains them with KD and also trains its sampler

---

```
Result: e_n or loss_m;
Initialize: Δ, KSTORE;
if stuGen.Sampler.predict == TRUE then
    { a } = computeAttrib(M_stu, D_m);
    if similarity(a, KSTORE.nasKD.attributes) then
        e_n = KSTORE.nasKD.retrive.e_n;
        KSTORE.nasKD.update.e_n=USED
    end
    else
    e_n = samplerM.predict(nSpace);
    end
    return e_n
end
else if stuGen.Sampler.train == TRUE then
    if samplerM == BO then
        BOsampler.train(nSpace, e_n, loss_m);
    end
    else if samplerM == RL then
        if lossm == 1 then
        reward = -1;
        end
        else
            reward = calc_reward(loss_m);
        end
        agentRL.train(e_n, reward)
    end
end
else if stuGen.kdTrain == TRUE then
loss_m = kdTrain(M, M_stu, D_m);
return loss_m
end
```

---

Algorithm 7: kdTrain trains the student network
using knowledge distillation technique

---

```
Data: Teacher model M, student model M_stu, Data D_m
Result: trained student model M_stu
Initialize: Temperature T , umber of epochs e_kl , e_cc;
soft_t, soft_s = modify_softmax(M, M_stu,layer_list, T);
yt_soft = soft_t.predict(X_train);
while e ≤ e_kl do
    soft_s.train(X_train, yt_soft, optimizer =
    opt, loss = T * T * ckl( ))
end
while e ≤ ecc do
    soft_s.train (X_train, y_train, optimizer =
    opt, loss = ccl( ))
end
```

---

EXPERIMENTAL DETAILS: Several well-known deep learning models from the computer vision and NLP domains were selected. For the AutoPCQ technique performance of several optimizers on time to optimize, compression achieved, accuracy and number and diversity of samples which produce good results is documented. For the AKD technique results for only VGG16 model are presented for the sake brevity. The time for rNAS is documented for the discovered student model architecture, size reduction achieved and accuracy loss with respect to the original VGG16 model is recorded.

Experimental Setup consisted of AWS p3.2xlarge instance: Intel Xeon E5-2686 v4 Broadwell 4 cores, 60 GB RAM, Nvidia Volta V100 GPU with 16 GB RAM Evaluations: In this section the performance of automated model optimization of the method disclosed herein is analyzed. Time taken by different methods in art is compared, any change accuracy of the optimized model with respect to original model and the compression factor achieved is noted. The method and system disclosed effectively achieves model compression without any compromise in accuracy. The table 1 table illustrates the compression achieved for different models.

TABLE 1

| Compression achieved, accuracy change and time for model optimization via AutoPCQ | | | |
| --- | --- | --- | --- |
| | VGG16 | MNIST | LSTM |
| compF | 9.9 | 7.18 | 3.03 |
| % acc change | +1.2% | +1.49% | +2.0% |
| Time (sec) | 2225.4 | 1596.24 | 433 |

It can be seen that the optimization has improved the accuracy, of the model in most of the cases. The developed system implements optimization aware fine tuning, which results in accuracy improvement in many instances. 8 min for rNAS 90 min for training. Similarly, the table 2 summarizes the time for student rNAS and KD training for VGG16 model.

TABLE 2

| Compression achieved, accuracy change and time for model optimization via AKD | |
| --- | --- |
| Attribute | Value |
| compF | 12 |
| Student acc w.r.t to teacher | −2.8% |
| Time for NAS (min) | 8 |
| Time to train student (min) | 92 |

Figure 5:
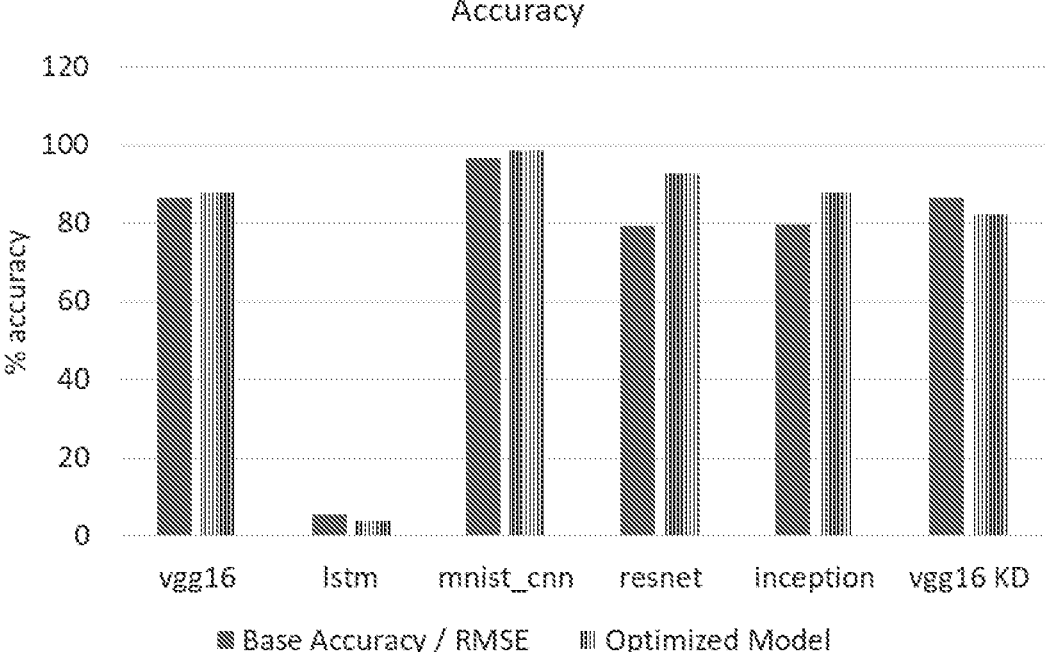
FIGS. 5 and 6 depict performance of the two-step hierarchical model optimization applied on standard DL models, in accordance with some embodiments of the present disclosure.
Figure 6:
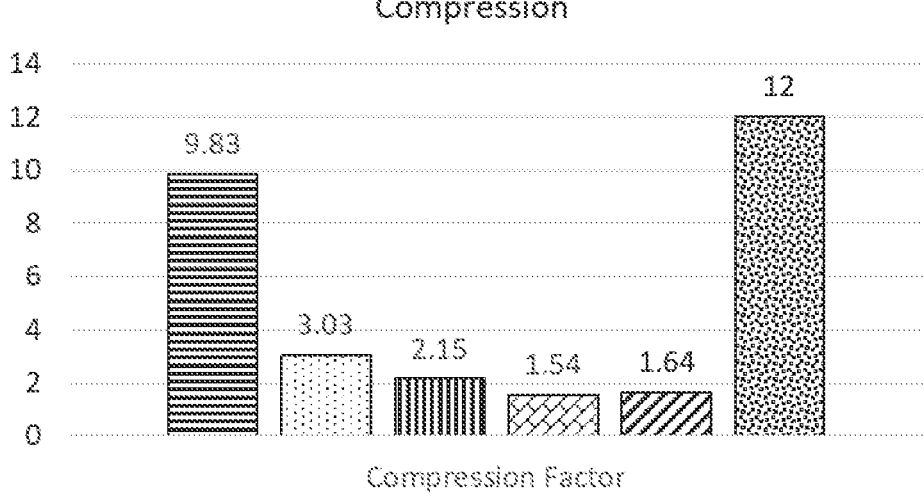

FIGS. 5 and 6 depict performance of the two-step hierarchical model optimization applied on standard DL models, in accordance with some embodiments of the present disclosure. As observed from bar graphs of FIG. 5, the optimized model obtained via the two-step hierarchical optimization achieves higher model accuracy as compared to its original standard DL models shown in the graph. This is a critical contribution of the method disclosed, where hardly any loss is observed post optimization. FIG. 6 represents compression factor, which is the ratio of original standard DL model size to the corresponding optimized model. As can be observed, the compression achieved for DL model vgg-16 is 9,83 times, which is considerable while handling stringent hardware constraints such as memory, while implementing DL models on end devices.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for model optimization, the method comprising:

receiving an input, by one or more hardware processors, wherein the input further comprising a) a Deep learning (DL) model to be optimized, b) a training dataset for the DL model comprising a training data, a validation data and a test data, wherein the training dataset is used for training, testing, and validating an optimized model, and c) resource constraints of an end device on which the DL model is to be implemented, wherein the resource constraints of the end device include hardware constraints specified by an end user to ensure optimization is obtained for the DL model, retaining maximum accuracy, reducing loss due including small memory input;

identifying an appropriate technique for the received DL model for the hardware constraints specified by an end user to ensure best optimization is obtained for the DL model, retaining maximum accuracy, reducing loss due;

applying the identified technique, by the one or more hardware processors, a two-step hierarchical model optimization approach on the DL model to obtain an optimized model ($M_{opt}$) fitting to the resource constraints, by utilizing an Automated Pruning-weight Clustering-Quantization (AutoPCQ) technique followed by conditional application of an Automated Knowledge Distillation (AKD) technique, wherein the two-step hierarchical model optimization approach comprising:

(A) triggering the AutoPCQ technique that formulates a problem of configuration selection of the DL model as an optimization problem by iteratively applying Bayesian Optimization (BO) and Reinforcement Learning (RL) automates the process to arrive at an optimal configuration using the AutoPCQ, wherein, the AutoPCQ technique comprising:

(i) defining a Configuration Space (CS) for the DL model on which optimization is to be carried out, wherein the CS further comprising parameter configurations for a pruning ($C_p$), a weight clustering ($C_{wc}$), a quantization ($C_q$), and a model layer configuration ($C_m$) for the DL model, wherein $\{CS=C_p \ UC_{wc} \cup C_q \ \cup C_m\}$, provide a unified way to define configurations space and automatically generate configurations space with specific format;

(ii) obtaining the optimized model ($M_{opt}$) of the DL model in accordance with the Configuration Space $\{CS=C_p \cup C_{wc} \cup C_q \ \cup C_m\}$ using the training dataset by iteratively performing, for a preset number of trials, steps further comprising:

1) Retrieving one or more best configurations (c) from a database KSTORE for the DL model in accordance with the Configuration Space (CS) based on attribute matching with respect to a plurality of attributes derived for the DL model;

2) Performing an initial optimizing of the DL model to obtain a current $M_{opt}$ based on the retrieved one or more configurations;

3) Evaluating the current $M_{opt}$ using the trained dataset to determine a loss and a compression factor with respect to the DL model; and 4) Comparing the loss in each iteration against a preset loss ($\delta$) to identify the current $M_{opt}$ as the optimized model ($M_{opt}$) if the loss is less than a preset loss ($\delta$), computed based on the resource constraints of the end device;

optimizing the AutoPCQ technique for DL model optimization process, via pruning weight clustering quantization (PCQ), wherein the PCQ comprises:

loading the DL a deep learning model and associated training data;

constructing the CS a configuration space for the DL deep learning model;

sampling one or more configurations from the CS configuration space;

applying a sampled configuration to the DL deep learning model;

training the DL deep learning model using the applied configuration;

evaluating the trained model to determine an accuracy metric; and iteratively repeating the sampling, applying, training, and evaluating steps until a termination condition is met; and (B) automatically triggering the AKD technique if the loss for the current $M_{opt}$ is greater than the preset loss ($\delta$) after iterating through the preset number of trials, wherein the AKD technique formulates automated search of a student model as the optimization problem with the DL model representing a teacher model, wherein a search space for the student model is defined by a restricted Neural Network Architecture Search (rNAS) that restricts the search space based on (a) network attributes of the teacher model, (b) constraints on size reduction factor and (c) incorporating advance pruners for early stopping of training of an identified sampled network if progress is not as required satisfactory, and wherein the student model obtained provides the optimized model ($M_{opt}$).

2. The method of claim 1, wherein the AKD technique comprising:

inspecting the DL model, which is the teacher model, to generate a model summary;

setting, based on the model summary, an upper limit, and a lower limit of each network parameter in the search space of the rNAS to restrict the search space;

iteratively performing, until the preset number of trials is reached, steps of:

predicting an encoded sample network;

constructing and compiling the student model based on the encoded sample network using the BO and RL via a student generator;

estimating size reduction of the student model by calculating a ratio ($\eta$) of number of parameters or ratio of zipped size of the teacher model and the student model; and performing one of (a) training the student model if the n is above a preset threshold, and (b) skipping the training and penalizing the student generator, if the $\eta$ is equal to or below the preset threshold.

3. A system for model optimization, the system comprising:

a memory storing instructions;

one or more Input/Output (I/O) interfaces; and one or more hardware processors coupled to the memory via the one or more I/O interfaces, wherein the one or more hardware processors are configured by the instructions to:

receive an input wherein the input further comprising a) a Deep learning (DL) model to be optimized, b) a training dataset for the DL model comprising a training dataset, a validation data and a test data, a validation data and a test data, wherein the training dataset is used for training, testing, and validating an optimized model, and c) resource constraints of an end device on which the DL model is to be implemented, wherein the resource constraints of the end device include hardware constraints specified by an end user to ensure optimization is obtained for the DL model, retaining maximum accuracy, reducing loss due including small memory input;

identify an appropriate technique for the received DL model for the hardware constraints specified by an end user to ensure best optimization is obtained for the DL model, retaining maximum accuracy, reducing loss due;

apply the identified technique, a two-step hierarchical model optimization approach on the DL model to obtain an optimized model ($M_{opt}$) fitting to the resource constraints, by utilizing an Automated Pruning-weight Clustering-Quantization (AutoPCQ) technique followed by conditional application of an Automated Knowledge Distillation (AKD) technique, wherein the two-step hierarchical model optimization approach comprising:

(A) triggering the AutoPCQ technique that formulates a problem of configuration selection of the DL model as an optimization problem by iteratively applying Bayesian Optimization (BO) and Reinforcement Learning (RL) automates the process to arrive at an optimal configuration using the AutoPCQ, wherein, the AutoPCQ technique comprising:

(i) defining a Configuration Space (CS) for the DL model on which optimization is to be carried out, wherein the CS further comprising parameter configurations for a pruning ($C_p$), a weight clustering ($C_{wc}$), a quantization ($C_q$), and a model layer configuration ($C_m$) for the DL model, wherein $\{CS=C_p \cup C_{wc} \cup C_q \cup C_m\}$, provide a unified way to define configurations space and automatically generate configurations space with specific format; and (ii) obtaining the optimized model ($M_{opt}$) of the DL model in accordance with the Configuration Space $\{CS=C_p \cup C_{wc} \cup C_q \cup C_m\}$ using the training dataset by iteratively performing, for a preset number of trials, steps further comprising:

1) Retrieving one or more best configurations (c) from a database KSTORE for the DL model in accordance with the Configuration Space (CS) based on attribute matching with respect to a plurality of attributes derived for the DL model;

2) Performing an initial optimizing of the DL model to obtain a current $M_{opt}$ based on the retrieved one or more configurations;

3) Evaluating the current $M_{opt}$ using the trained dataset to determine a loss and a compression factor with respect to the DL model; and 4) Comparing the loss in each iteration against a preset loss ($\delta$) to identify the current $M_{opt}$ as the optimized model ($M_{opt}$) if the loss is less than a preset loss ($\delta$), computed based on the resource constraints of the end device;

optimizing the AutoPCQ technique for DL model optimization process, via pruning weight clustering quantization (PCQ), wherein the PCQ comprises:

loading the DL a deep learning model and associated training data;

constructing the CS a configuration space for the deep learning model;

sampling one or more configurations from the CS configuration space;

applying a sampled configuration to the deep learning model;

training the DL deep learning model using the applied configuration;

evaluating the trained model to determine an accuracy metric; and iteratively repeating the sampling, applying, training, and evaluating steps until a termination condition is met; and (B) automatically triggering the AKD technique if the loss for the current $M_{opt}$ is greater than the preset loss ($\delta$) after iterating through the preset number of trials, wherein the AKD technique formulates automated search of a student model as the optimization problem with the DL model representing a teacher model, wherein a search space for the student model is defined by a restricted Neural Network Architecture Search (rNAS) that restricts the search space based on (a) network attributes of the teacher model, (b) constraints on size reduction factor and (c) incorporating advance pruners for early stopping of training of an identified sampled network if progress is not as required satisfactory, and wherein the student model obtained provides the optimized model ($M_{opt}$).

4. The system of claim 3, wherein the AKD technique comprising:

inspecting the DL model, which is the teacher model, to generate a model summary;

setting, based on the model summary, an upper limit, and a lower limit of each network parameter in the search space of the rNAS to restrict the search space;

iteratively performing, until the preset number of trials is reached, steps of:

predicting an encoded sample network;

constructing and compiling the student model based on the encoded sample network using the BO and RL via a student generator;

estimating size reduction of the student model by calculating a ratio ($\eta$) of number of parameters or ratio of zipped size of the teacher model and the student model; and performing one of (a) training the student model if the n is above a preset threshold, and (b) skipping the training and penalizing the student generator, if the $\eta$ is equal to or below the preset threshold.

5. One or more non-transitory machine-readable information storage mediums comprising one or more instructions which when executed by one or more hardware processors cause:

receiving an input wherein the input further comprising a) a Deep learning (DL) model to be optimized, b) a training dataset for the DL model comprising a training data, a validation data and a test data and, wherein the training dataset is used for training, testing, and validating an optimized model, c) resource constraints of an end device on which the DL model is to be implemented, wherein the resource constraints of the end device include hardware constraints specified by an end user to ensure optimization is obtained for the DL model, retaining maximum accuracy, reducing loss due including small memory input;

identifying an appropriate technique for the received DL model for the hardware constraints specified by an end user to ensure best optimization is obtained for the DL model, retaining maximum accuracy, reducing loss due;

applying the identified technique, a two-step hierarchical model optimization approach on the DL model to obtain an optimized model ($M_{opt}$) fitting to the resource constraints, by utilizing an Automated Pruning-weight Clustering-Quantization (AutoPCQ) technique followed by conditional application of an Automated Knowledge Distillation (AKD) technique, wherein the two-step hierarchical model optimization approach comprising:

triggering the AutoPCQ technique that formulates a problem of configuration selection of the DL model as an optimization problem by iteratively applying Bayesian Optimization (BO) and Reinforcement Learning (RL) automates the process to arrive at an optimal configuration using the AutoPCQ, wherein, the AutoPCQ technique comprising:

(i) defining a Configuration Space (CS) for the DL model on which optimization is to be carried out, wherein the CS further comprising parameter configurations for a pruning ($C_p$), a weight clustering ($C_{wc}$), a quantization ($C_q$), and a model layer configuration ($C_m$) for the DL model, wherein $\{CS=C_p \cup C_{wc} \cup C_q \cup C_m\}$, provide a unified way to define configurations space and automatically generate configurations space with specific format;

(ii) obtaining the optimized model ($M_{opt}$) of the DL model in accordance with the Configuration Space $\{CS=C_p \cup C_{wc} \cup C_q \cup C_m\}$ using the training dataset by iteratively performing, for a preset number of trials, steps further comprising:

1) Retrieving one or more best configurations (c) from a database KSTORE for the DL model in accordance with the Configuration Space (CS) based on attribute matching with respect to a plurality of attributes derived for the DL model;

2) Performing an initial optimizing of the DL model to obtain a current $M_{opt}$ based on the retrieved one or more configurations;

3) Evaluating the current $M_{opt}$ using the trained dataset to determine a loss and a compression factor with respect to the DL model; and 4) Comparing the loss in each iteration against a preset loss ($\delta$) to identify the current $M_{opt}$ as the optimized model ($M_{opt}$) if the loss is less than a preset loss ($\delta$), computed based on the resource constraints of the end device;

optimizing the AutoPCQ technique for DL model optimization process, via pruning weight clustering quantization (PCQ), wherein the PCQ comprises:

loading the DL a deep learning model and associated training data;

constructing the CS a configuration space for the DL deep learning model;

sampling one or more configurations from the CS configuration space;

applying a sampled configuration to the DL deep learning model;

training the DL deep learning model using the applied configuration;

evaluating the trained model to determine an accuracy metric; and iteratively repeating the sampling, applying, training, and evaluating steps until a termination condition is met; and (B) automatically triggering the AKD technique if the loss for the current $M_{opt}$ is greater than the preset loss ($\delta$) after iterating through the preset number of trials, wherein the AKD technique formulates automated search of a student model as the optimization problem with the DL model representing a teacher model, wherein a search space for the student model is defined by a restricted Neural Network Architecture Search (rNAS) that restricts the search space based on (a) network attributes of the teacher model, (b) constraints on size reduction factor and (c) incorporating advance pruners for early stopping of training of an identified sampled network if progress is not as required satisfactory, and wherein the student model obtained provides the optimized model ($M_{opt}$).

6. The one or more non-transitory machine-readable information storage mediums of claim 5, wherein the AKD technique comprising:

inspecting the DL model, which is the teacher model, to generate a model summary;

setting, based on the model summary, an upper limit, and a lower limit of each network parameter in the search space of the rNAS to restrict the search space;

iteratively performing, until the preset number of trials is reached, steps of:

predicting an encoded sample network;

constructing and compiling the student model based on the encoded sample network using the BO and RL via a student generator;

estimating size reduction of the student model by calculating a ratio ($\eta$) of number of parameters or ratio of zipped size of the teacher model and the student model; and performing one of (a) training the student model if the n is above a preset threshold, and (b) skipping the training and penalizing the student generator, if the $\eta$ is equal to or below the preset threshold.

\* \* \* \* \*